United States Patent
Frikker et al.

(10) Patent No.: US 8,146,120 B2
(45) Date of Patent: Mar. 27, 2012

(54) MULTI-CRITERIA RATING AND SEARCHING SYSTEM

(75) Inventors: Joseph Emmett Frikker, Redwood City, CA (US); James Richard Kellas, Milpitas, CA (US); Nicolas Alexei Braem, San Francisco, CA (US); Sean Ryan S H Ma, San Mateo, CA (US); David Bao Le, Oakland, CA (US); James Herre, San Francisco, CA (US)

(73) Assignee: Jaman.com, Inc., San Mateo, CA (US)

( * ) Notice: Subject to any disclaimer, the term of this patent is extended or adjusted under 35 U.S.C. 154(b) by 431 days.

(21) Appl. No.: 12/204,792

(22) Filed: Sep. 4, 2008

(65) Prior Publication Data

US 2009/0100455 A1 Apr. 16, 2009

Related U.S. Application Data

(60) Provisional application No. 60/978,317, filed on Oct. 8, 2007.

(51) Int. Cl.
H04N 7/173 (2006.01)
(52) U.S. Cl. ............................. 725/46; 725/53; 709/219
(58) Field of Classification Search .............. 725/37–61; 709/217–231
See application file for complete search history.

(56) References Cited

U.S. PATENT DOCUMENTS

| | | | |
|---|---|---|---|
| 5,841,437 A | | 11/1998 | Fishkin et al. |
| 5,842,199 A * | | 11/1998 | Miller et al. ............................ 1/1 |
| 6,163,316 A * | | 12/2000 | Killian ............................ 715/721 |
| 6,631,522 B1 * | | 10/2003 | Erdelyi ............................ 725/53 |
| 6,704,028 B2 * | | 3/2004 | Wugofski ............................ 715/719 |
| 6,826,774 B1 * | | 11/2004 | Holme ............................ 725/39 |
| 6,851,090 B1 * | | 2/2005 | Gutta et al. ............................ 715/716 |
| 6,904,263 B2 * | | 6/2005 | Grudnitski et al. ............ 434/308 |
| 7,343,354 B2 * | | 3/2008 | Hennessey ............................ 705/400 |
| 7,412,202 B2 * | | 8/2008 | Gutta et al. ............................ 455/3.01 |
| 7,634,538 B2 * | | 12/2009 | Mori et al. ............................ 709/204 |
| 7,676,205 B2 * | | 3/2010 | Moffatt et al. ............. 455/226.1 |
| 7,721,310 B2 * | | 5/2010 | Schaffer et al. ................. 725/46 |
| 7,730,509 B2 * | | 6/2010 | Boulet et al. ..................... 725/46 |
| 7,861,258 B2 * | | 12/2010 | Barton et al. .................... 725/28 |
| 2003/0066085 A1 * | | 4/2003 | Boyer et al. .................. 725/104 |
| 2006/0026048 A1 | | 2/2006 | Kolawa et al. |
| 2006/0074859 A1 | | 4/2006 | Gange et al. |
| 2006/0212904 A1 * | | 9/2006 | Klarfeld et al. ................. 725/46 |
| 2007/0109616 A1 | | 5/2007 | Thompson |
| 2008/0282291 A1 * | | 11/2008 | Henty ............................ 725/44 |

OTHER PUBLICATIONS

Wang, L., et al, "A Dynamic Sub-vector Weighting Scheme for Image Retrieval with Relevance Feedback," Pattern Anal Applic, Nov. 27, 2002, pp. 212-223.

Fang, Li, "Image Retrieval with Relevance Feedback," Applied Imagery Pattern Recognition Workshop, 2000. Proceedings. 29th, 2000, pp. 85-91.

(Continued)

Primary Examiner — Annan Shang
(74) Attorney, Agent, or Firm — Blakely, Sokoloff, Taylor & Zafman LLP; Judith A. Szepesi

(57) ABSTRACT

A method and apparatus to provide a multi-criteria rating and search system is described. Users can provide ratings along multiple axes, which can then be used for searching.

20 Claims, 9 Drawing Sheets

OTHER PUBLICATIONS

Ahlberg, Christopher, et al, "Visual Information Seeking: Tight Coupling of Dynamic Query Filters with Starfield Displays," ftp://ftp.cs.umd.edu/pub/hcil/Reports-Abstracts-Bibliography/3131html/3131.html, accessed Dec. 12, 2008, 11 pages.

Klein, Peter, et al, "The Circle Segment View—A Visualization for Query Preview and Visual Filtering," University of Konstanz, Konstanz, Germany, 12 pages.

Hill, Will, et al, "Recommending and Evaluating Choices in a Virtual Community of Use," http://apparent-wind.com/navigation/videos.html, accessed Dec. 12, 2008, 12 pages.

Kumar, Harsha P., et al, "Browsing Hierarchical Data with Multi-Level Dynamic Queries and Pruning," University of Maryland, College Park, MD, Mar. 1995, 28 pages.

\* cited by examiner

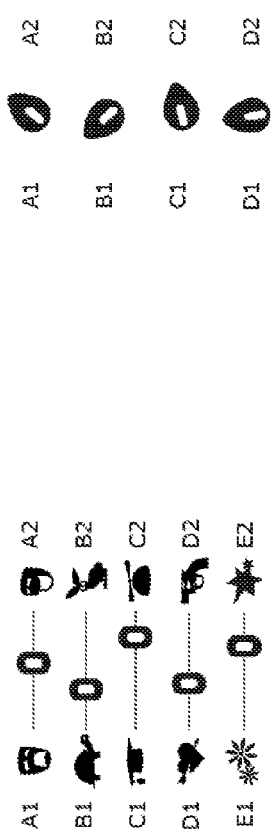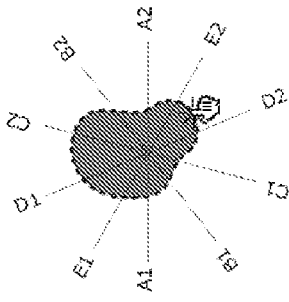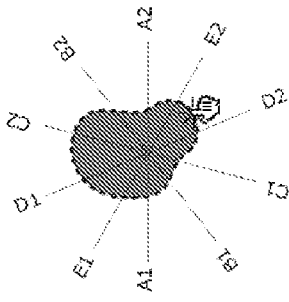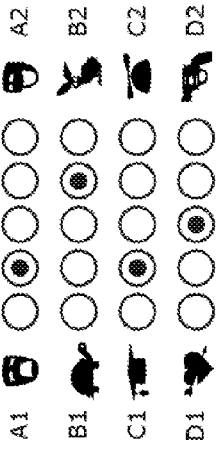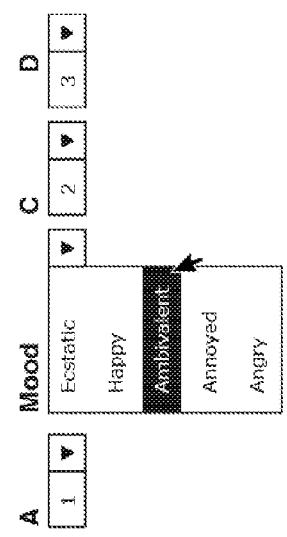

MULTI-CRITERIA RATING AND SEARCHING SYSTEM

RELATED APPLICATIONS

This patent application claims the benefit under 35 U.S.C. §119(e) of U.S. provisional application No. 60/978,317, filed Oct. 8, 2007, which is herein incorporated by reference.

FIELD OF THE INVENTION

The present invention relates to a search engine or recommendation engine, and more particularly to a community rating system that drives social and collaborative ratings to help users find the more relevant objects by leveraging the wisdom (i.e., ratings) of the community.

BACKGROUND

Numerous companies provide recommendation engines for items ranging from shoes to movies. Most recommendation engines use one of two approaches. In one approach, an expert rates the object. For example, movie reviews are an example of an expert driven system. Users can then see what the expert thought of the movie. In one embodiment, the prior art recommendation system may recommend objects to a user based on correlation between a user's past history (or activities) and the expert ratings of the various objects in the system.

An alternative approach is to collect ratings data from users. For example, Netflix™ allows users to rate movies on a 1-5 star scale. The system then correlates the user's ratings with other user's ratings, to predict a user's rating/preference on a movie based on other similar users in the system.

SUMMARY OF THE INVENTION

A method and apparatus to provide a multi-criteria rating and search system is described. Users can provide ratings along multiple axes, which can then be used for searching.

BRIEF DESCRIPTION OF THE DRAWINGS

The present invention is illustrated by way of example, and not by way of limitation, in the figures of the accompanying drawings and in which like reference numerals refer to similar elements and in which:

FIG. 1A-E illustrate various embodiments of selection interfaces which may be used to select between criteria.

FIG. 2 illustrates one embodiment of a slider interface for searching including displayed search results.

FIG. 4 illustrates one embodiment of a user adding to a movie's multi-criteria rating.

DETAILED DESCRIPTION

Figure 3:
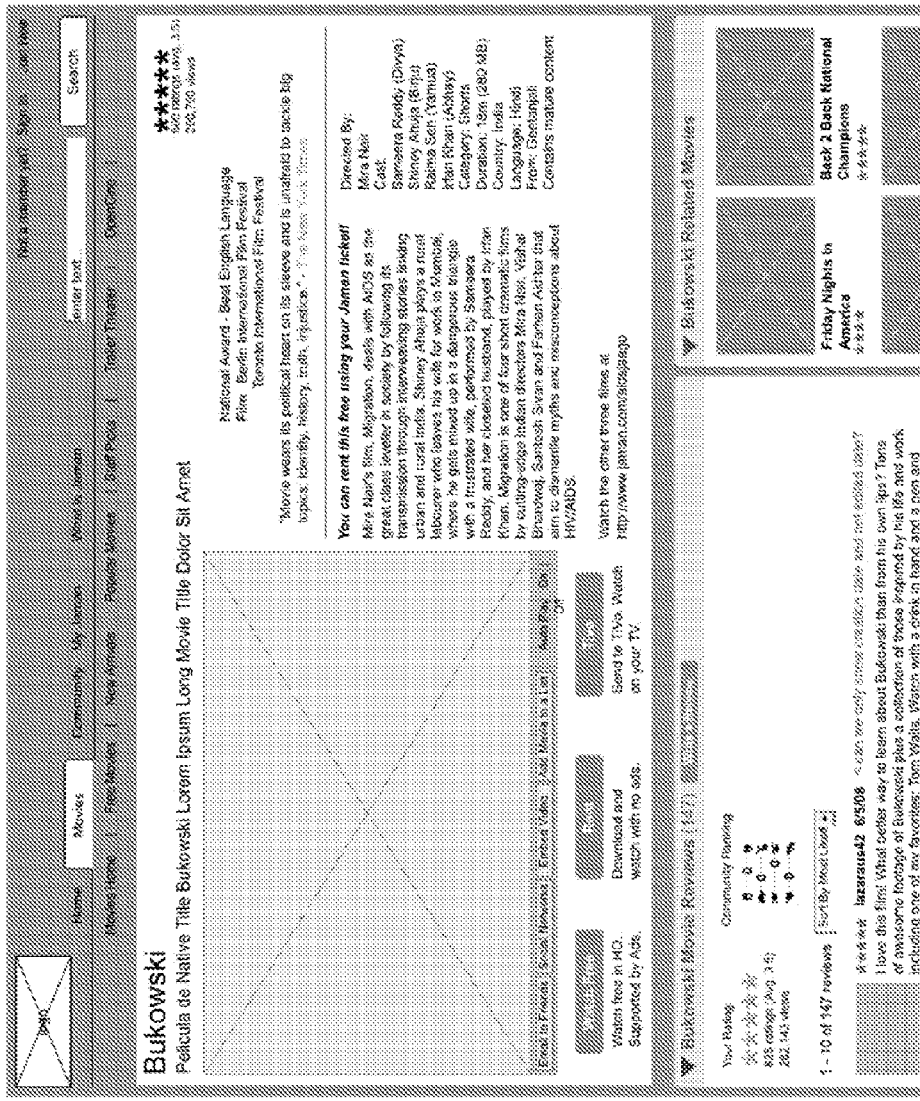
FIG. 3 illustrates one embodiment of a movie, including its multi-criteria rating.

The method and apparatus described is a multi-dimensional rating system to give users a quick way to find a search object. In one embodiment, the search object may be a movie.

Users have the option of rating the movie on a number of individual criteria. The rating may indicate where along a range the movie falls. For example, for a movie search, the criteria may be:

Serious—Funny
Mellow—Charged
Deep—Shallow
Tears—Bullets

Note that these categories are exemplary, and other categories may be used. For example, for music, the categories may include fast/slow, heavy beat/soft sounds, words/instruments, passive/aggressive. Alternative criteria may be used.

FIG. 1A-E illustrate some interfaces which may be used to make such a selection. FIG. 1A illustrates one embodiment of a slider interface which may be used to select between these criteria. The user can set these attributes by dragging a slider to one or the other side. Although these attributes are not mutually exclusive (e.g. a movie can be both serious AND funny), the user chooses between them. To keep it neutral, the user can leave the attribute in the middle. The sliders in one embodiment clearly show the middle position. In one embodiment, the sliders have 5 discrete positions on each side. When the user drags, the slider should jump from one position to the next. This means there are 11 positions in total per slider. In an alternative embodiment, the motion of the slider is smooth. In one embodiment, the smooth motion slider also has discrete positions which are determined without providing a jumping-type experience.

In one embodiment, the slider tool can be found and used in various locations. For example, in a web-based move viewing and searching tool, the slider tool can be used for various purposes. The slider tool can function as a search tool to enable a user to quickly find a movie that matches his or her mood.

The slider tool may be replaced by a knob selector (FIG. 1B), two dimensional map (FIG. 1C), dropdown menus (FIG. 1D), matrix, (FIG. 1E) or another format that enables a user to select preferences along at least two axes. In one embodiment, the two dimensional mapping shown in FIG. 1C may enable a user to select portions along both ends of an axis—e.g. 20% funny, and 60% serious as shown on axis C1/C2, as an example.

Figure 2:
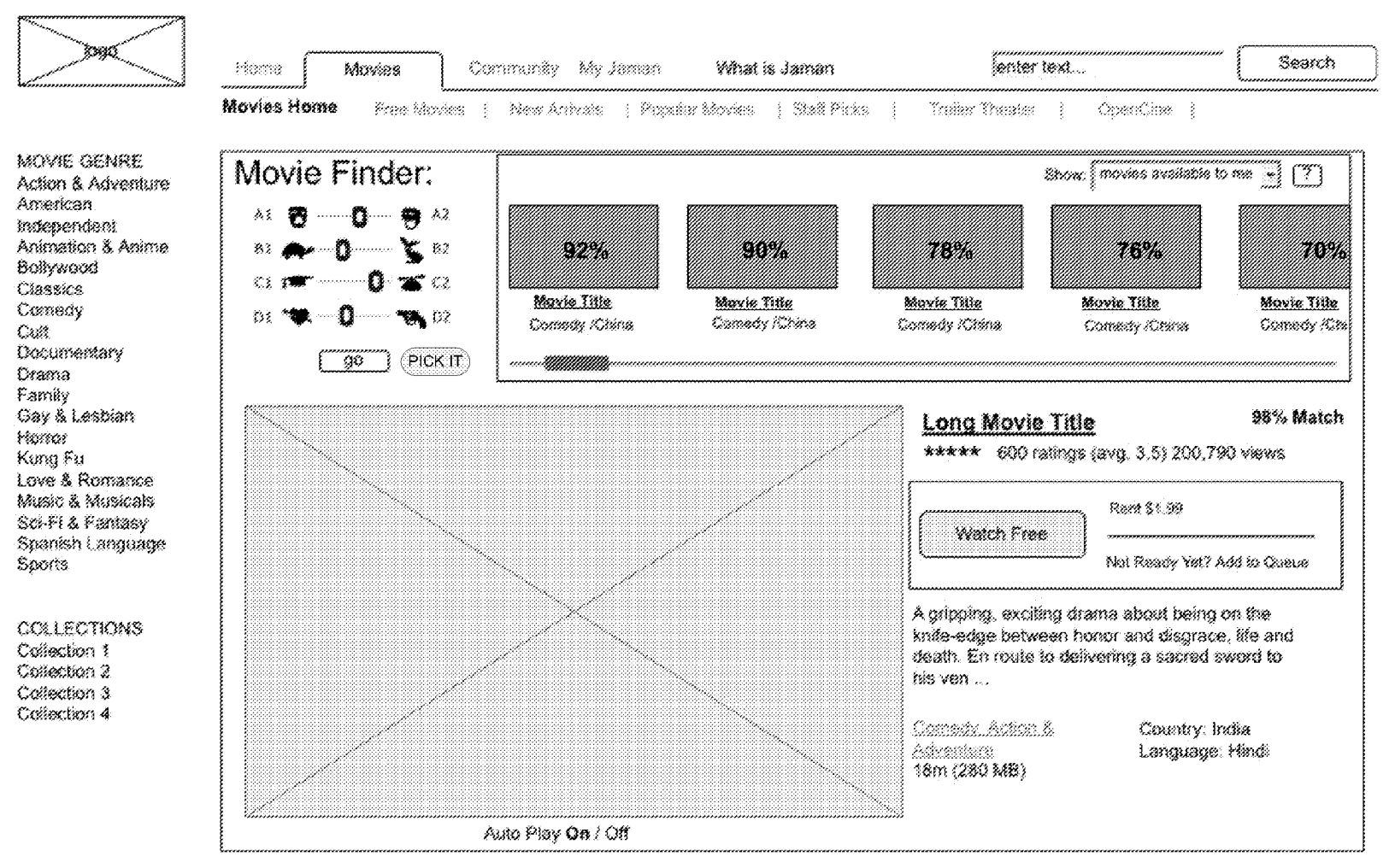

FIG. 2 illustrates the selection tool as a search tool, which concurrently displays the best match movies. Note that although in the below discussion reference is made to the "slider tool" any selection mechanism—whether shown in FIGS. 1A-E or not—should be understood to be included in the term "slider tool." In one embodiment, the screen is constantly updated with the best match movies. As shown in FIG. 2, in one embodiment, a percentage match is shown for each movie. In one embodiment, it is overlaid over a screenshot. In another embodiment, it is indicated below the screenshot. In one embodiment, the system includes a 'Pick It' button. The 'Pick It' button randomizes the values of the selector, and shows the movies that match the randomized values.

Figure 4:
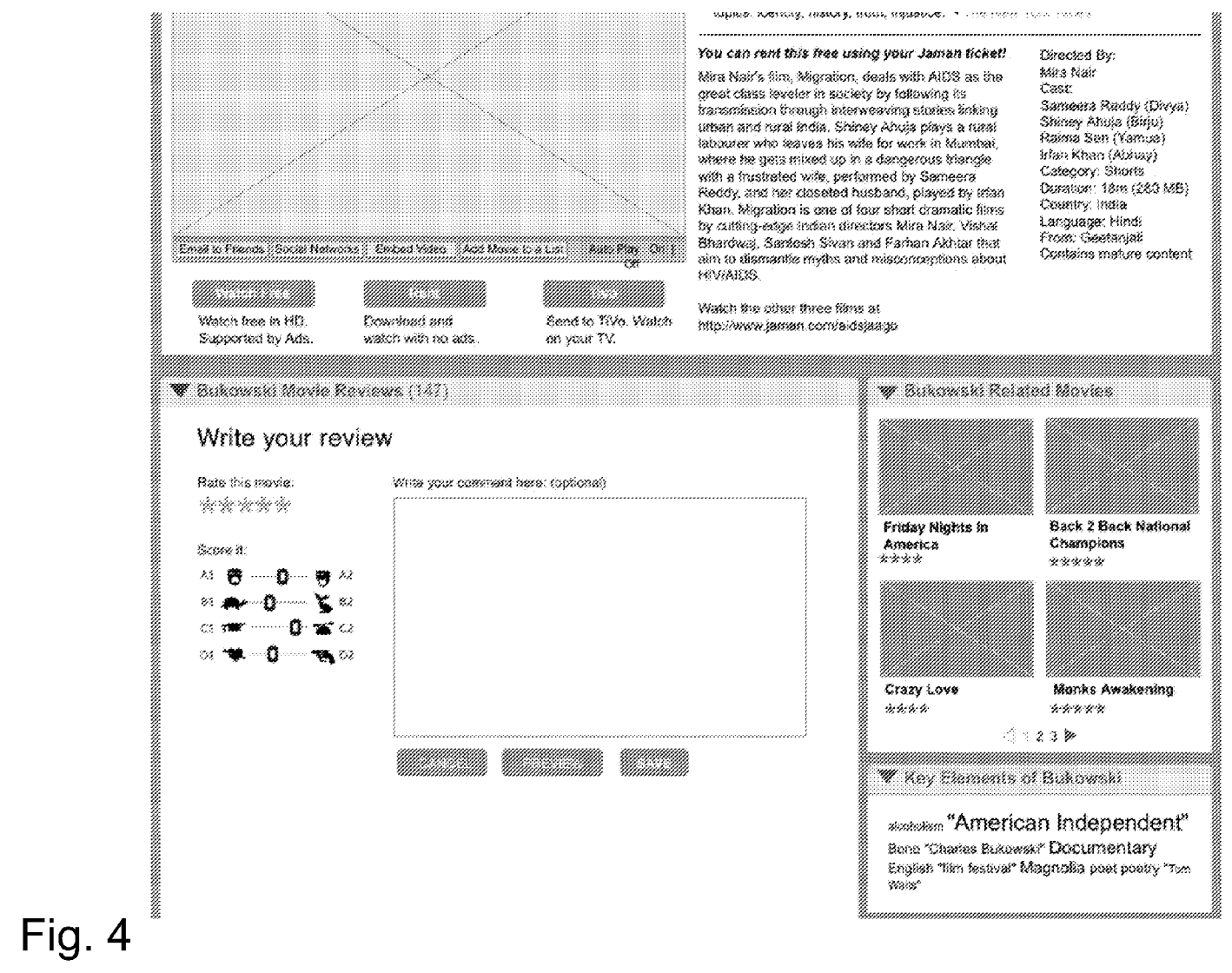

The slider tool can be present on a movie's own page, to display a cumulative rating of the movie along these axes, in one embodiment. FIG. 3 illustrates one embodiment of such a display. In one embodiment, the user may also provide his or her rating for the movie, on the movie's own page. On the video details page, the widget shows the community rating, i.e. value shows the average rating of all users who have rated it. If the user has rated the video himself, it should be easily visible. If the user hasn't rated the movie, the rating choice, one embodiment of which is shown in FIG. 4, provides that option. In one embodiment, on other pages, like the home page or search results, only the overall average rating is shown.

Figure 5:
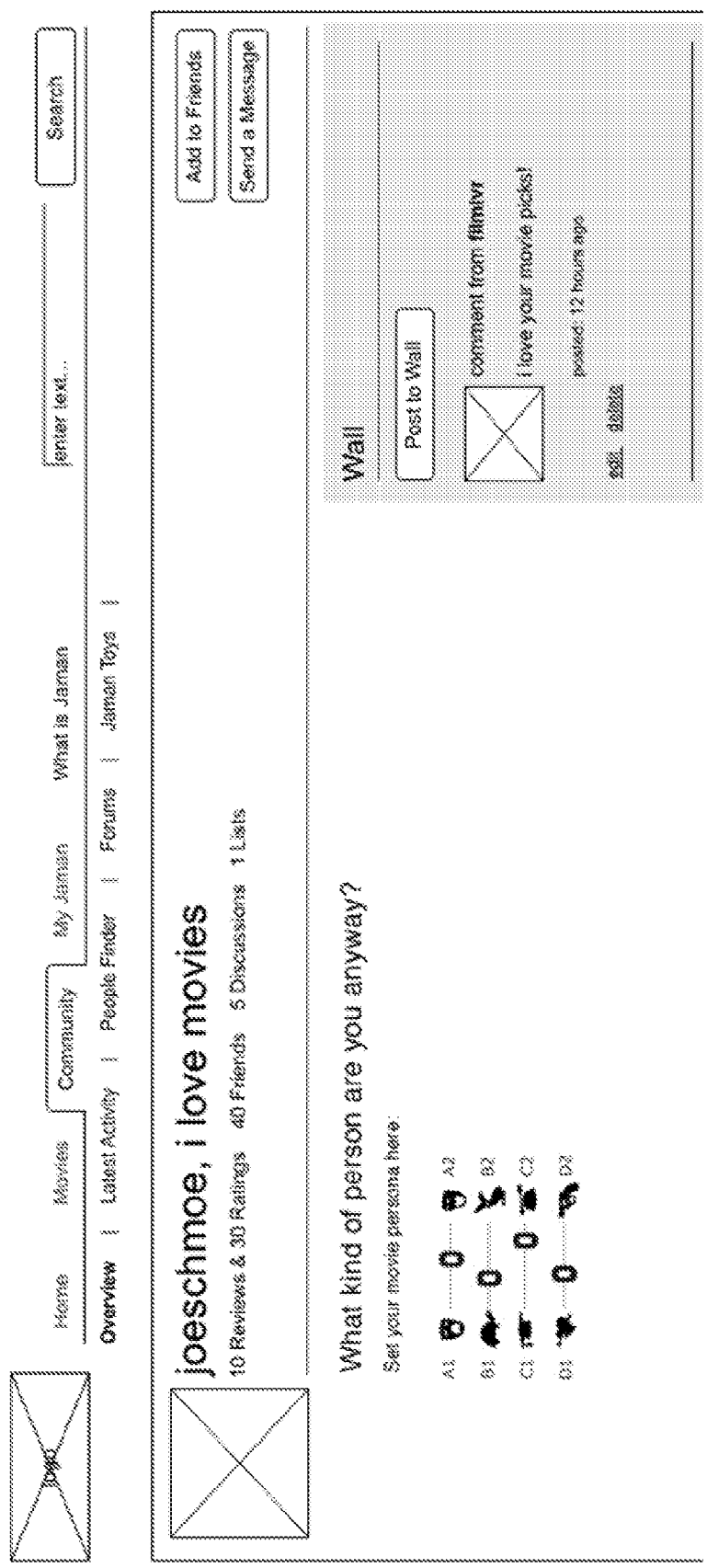
FIG. 5 illustrates one embodiment of using the multi-criteria rating in a profile.

In addition, to using the multi-criteria sliders to rate movies/music/etc., the sliders may also be used in a social-networking type of display. In one embodiment, a slider tool can be present on a user's personal page, which provides information about the user. The users may utilize a version of the slider tool to set personal preferences along the multiple criteria in their profile. These saved preferences then constitute a user's "persona." FIG. 5 illustrates one embodiment, of such a display. In one embodiment, the options provided by the persona ratings match those of the ratings for the movies/music/etc.

Figure 6:
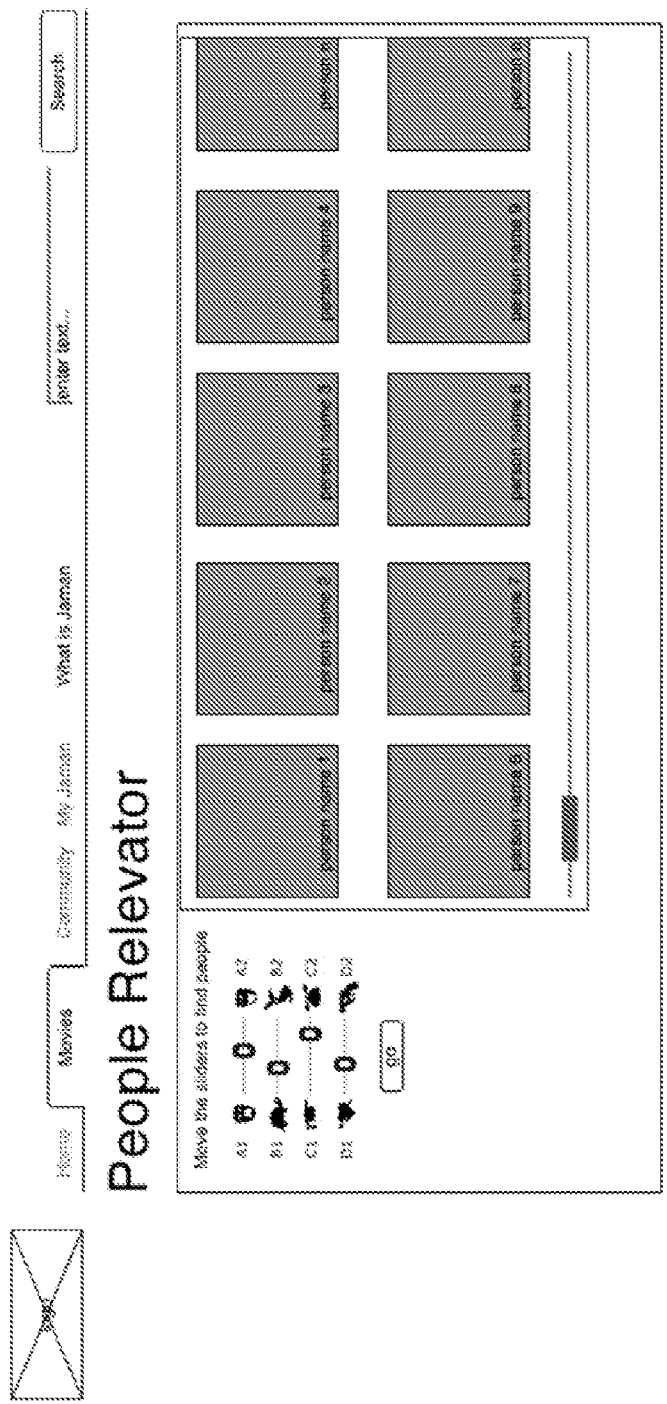
FIG. 6 illustrates one embodiment of using the profile multi-criteria rating for identifying other users.

In one embodiment, users may further specify their current mood, using the sliders. The indicated mood may appear on their profile page. In one embodiment, the system displays the mood and the time the mood was last updated in community activities. This will allow other users to search for people with similar current interests/moods. This can be used to search for relevant movies, by viewing the movie choices of users who exhibit a similar movie mood. FIG. 6 illustrates one embodiment of this search possibility. In one embodiment, like in searching for movies, the list of matching users is continuously updated as the user moves the sliders.

Figure 7:
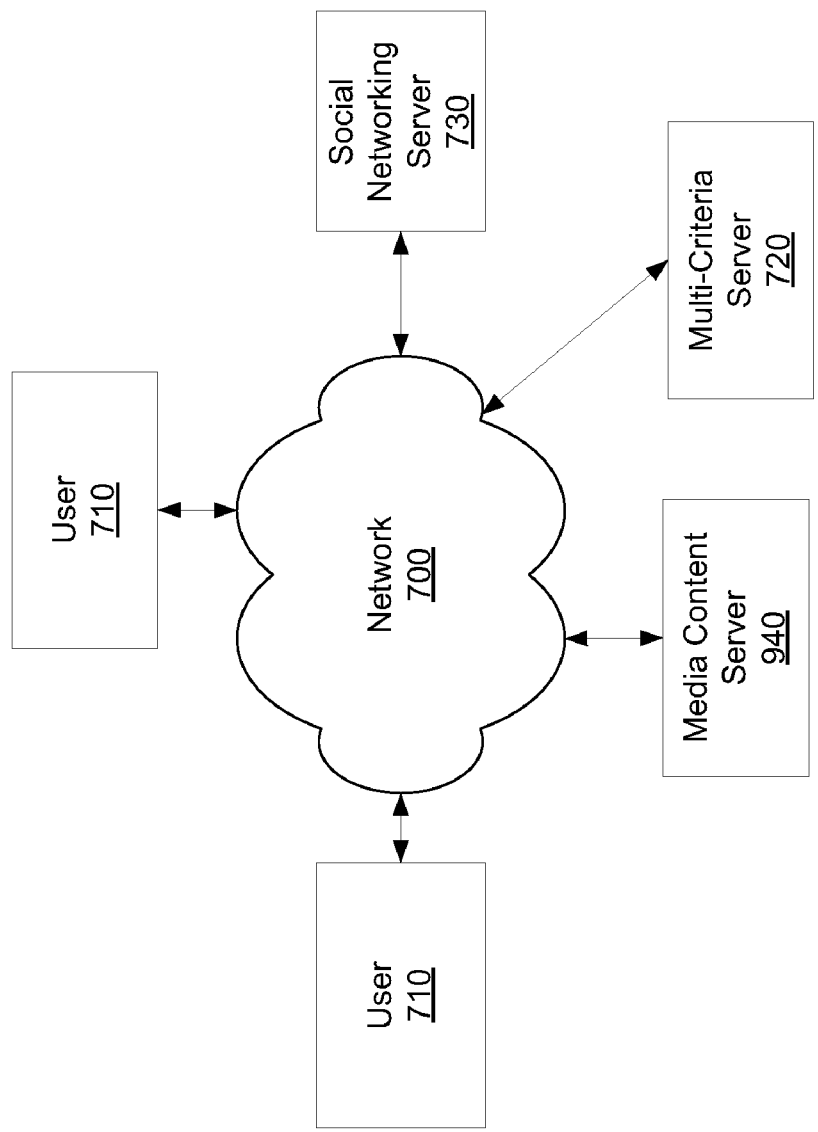
FIG. 7 is a network diagram of one embodiment of the system.

FIG. 7 is a network diagram of one embodiment of the system. The system includes one or more users 710, who connect to a server 720. In one embodiment, users connect to the server through a network 700 via a web browser. The server 720 is a metadata store, in one embodiment. In another embodiment, the server 720 stores the actual media content. In another embodiment, server 720 can send commands to media content server 730.

The server 720 is responsible for storing all users' ratings. In one embodiment, server 720 may be a distributed server. For example, metadata for a subset of movies may be served from a particular server, while other data is served from other servers. In another embodiment, server 720 may refer to a server cluster, as is known in the art.

In one embodiment, the social rating—i.e. mood and user search—are handled by the same server 720. In another embodiment, they may be handled on a separate server.

Figure 8:
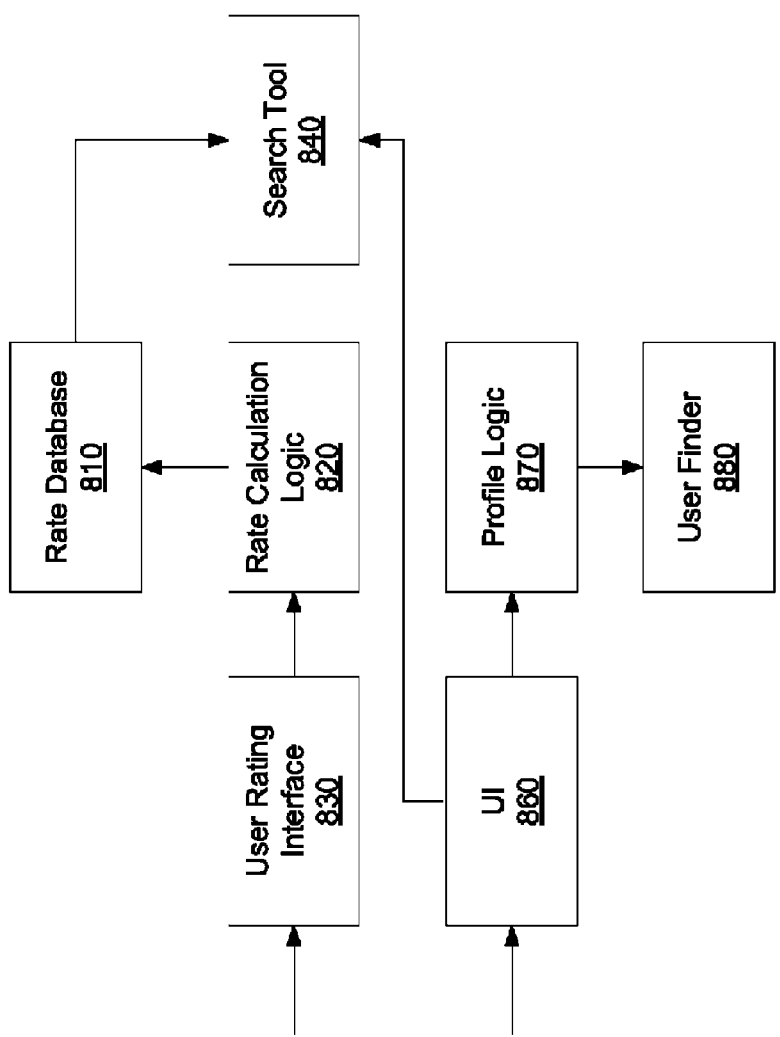
FIG. 8 is a block diagram of one embodiment of the system.

FIG. 8 is a block diagram of one embodiment of server 720. In one embodiment, server 720 includes rate database 810, which stores movie ratings. While this is referred to as a database, alternative data storage structures may be utilized. In one embodiment, each movie has a single rating for each attribute pair, which is a calculated average of the ratings of the various users. In one embodiment, the rate database 810 will store four numbers (one for each pair of attributes) representing that user's rating of this movie. In one embodiment, each number is in the range 1-100 inclusive.

In one embodiment, a user rating interface 830 will verify that a user specified all four ratings together. In another embodiment, the user need not provide more than one rating. In another embodiment, the user can provide the rating one at a time.

Rate calculation logic 820 receives rating data from user rating interface 830. Rate calculation logic 820 then uses the data to calculate an average rating. In one embodiment, the rating may not be a pure average, it may be a weighted average. For example, in one embodiment, users with more experience, or expertise, may have their ratings weighted more heavily than new users.

When a user updates their rating of a movie, in one embodiment, the rate calculation logic 820 calculates an updated average rating for that movie in each of the four categories, as well as the standard deviation. Both of these values are used in the movie finder algorithm, in one embodiment. In one embodiment, the average in each category will be displayed in the movie detail page and presented as community average ratings for these categories.

The results from rate calculation logic 820 are stored in rate database 810.

Search tool 840 determines which movies should be shown in the movie finder in response to a given user criteria. When a user is using the movie finder, the client sends the server a sequence of four numbers in the range 1-100 inclusive representing the user's search criteria. This data is received by the user search interface and displays to the users the closest movies matches in descending order of relevance percentage.

When searching for movies matching a given criteria, in one embodiment, multiple aspects are evaluated. First, in one embodiment, the system looks at how far the average rating for a given movie is from the search criteria the user entered. Second, in one embodiment, the system takes into account the accuracy of the average rating.

In order to determine the average rating's accuracy, in one embodiment the standard deviation of the rating is determined. Imagine two movies, A and B. Movie A has a small standard deviation for criteria 1 (users have rated it very similarly). Movie B has a large standard deviation for criteria 1 (users have rated it very differently). Both movies have an average rating for criteria 1 near the middle value. If a user searches for a movie with a rating near the middle value for criteria 1, movie A should be displayed first, even though the averages are the same. If a user searches for a movie with a rating far away from the middle value, movie B should show up first, because although the user probably doesn't want movie B, they definitely don't want movie A.

Using these techniques ideas, in one embodiment, the search tool 840 will generate a score between 0 and 1 for each rating category for each movie, given a user search criteria. It will then combine the scores for each movie and return the highest-scoring movies to the user. In one embodiment, the scores are combined by generating a product. In one embodiment, the scores are added. In one embodiment, the UI will show the overall score for the movie as a percentage.

In one embodiment, the formula for calculating the score for each rating criteria for a given movie given a user search criteria is as follows:

$$1/(1+\text{EXP}((\text{ABS}(\text{USER\_TARGET}-\text{MEAN})-50)/(10+2*\text{STD\_DEV})))$$

where:
USER_TARGET is the target the user picked for the rating criteria in question
MEAN is the average rating for that movie for that criteria, and
STD_DEV is the standard deviation.

The scoring function is, in one embodiment, a sigmoid of the distance between the target and the average, with the height of the sigmoid being inversely proportional to the standard deviation. This is a simple calculation, but provides the result of making the score decrease with distance from the mean, making the score increase near the mean as standard deviation decreases, and making the score decrease far from the mean as standard deviation decreases.

In one embodiment, the standard deviation of a rating can be used to determine the rating's reliability. Alternatively, the number of ratings can be used in the same capacity. The assumption is that the more ratings a movie has, the closer the average rating will be to the 'true' average. When searching for movies matching a rating criteria, in one embodiment the system uses the geometric distance between a movie's average rating and the target rating as the score function, with the number of ratings acting as an additional dimension. In this case, in one embodiment, the 'number of ratings' dimension in the target query would be set to some large number, which should be greater than the maximum number of ratings any movie in the system has. Making it higher will decrease the importance of the number of ratings a movie has in the final result. Using the number of ratings as an additional dimension when calculating the geometric distance allows the search algorithm to take rating reliability into account, without allowing it to overpower the average rating itself.

In one embodiment, when the score function used to determine how closely a given movie matches a given target criteria is simply the geometric distance, a number of performance optimizations are made. In one embodiment, the average ratings are arranged into 'bins'. For example, let's say each movie has ratings along four different dimensions, each between 0 and 100. Each dimension could be, in one embodiment, divided into five equal ranges. Each rating dimension of each movie could then be placed into its corresponding range. At the end, there would be 5^4, or 625 possible bins. Each movie would be assigned to a single bin. When searching for a limited number of movies matching a given target rating, these bins can be used to restrict the set of movies that need to be considered. In one embodiment, a target rating consists of four numbers, each representing a different rating dimension. From this, a list of bins at the minimal distance from the target can easily be computed, and movies in those bins moved to the target set. If the number of movies found in this way is insufficient, the process can be repeated using the set of bins slightly farther away, and so on. Although this approach is more approximate than calculating the score function individually for each movie, it comes with enormous computational savings.

Additionally, if some bins are found to contain many more movies than other bins, searching could be limited to only the largest bins. This means that some movies will never be returned, but in a large system it could help to further increase performance. It will also help performance in a sparsely populated data set, where many of the bins have no members.

A different optimization can also be implemented if the score function is simply the geometric distance. Instead of binning the movies, the queries can be binned. To do this, in one embodiment the system chooses a set of equally-spaced numbers within each dimension. For example, the system may select six separate value ranges, yielding 6^4, or 1296 possible bins. For each movie, and for each of these bins, the system in one embodiment computes the movie's score for that search criteria. For each bin, in one embodiment the sorted movie/score pairs are stored in a sorted index. When evaluating a query, the system finds the closest bin to the query, and uses its sorted list as the result set. As an option, if two or more movies share exactly the same score for a bin, in one embodiment the system could use the second closest or third closes bins as secondary or tertiary sorts.

Profile logic 870 allows the user to set a mood. In one embodiment, the mood is set using the same sliders as for ratings. In one embodiment, profile logic 870 propagates this information to the appropriate profile page, and recent activities page for friends of the user. In one embodiment, profile data is stored in rate database 810. In another embodiment, a profile database is used. Note that although the term "mood" is used, what is meant by that is what the user wishes to indicate to others. It may not reflect actual moods of the user.

User finder 880 enables the use of the mood, set by the user and stored by profile logic 870. In one embodiment, the logic behind the user finder 880 is much simpler. For each user, the profile logic 870 stores a current 'mood' (or movie taste) as a series of four numbers, in one embodiment, each ranging from 1-100 inclusive, representing the user's current mood in each of the four categories. These can be updated or fetched by the client at any time.

The user may indicate a type of mood profile to search for. When finding user matches given a user search criteria, in one embodiment the system uses a geometric distance between each user's mood and the user search criteria to rate the relevancy of each user for a given criteria. This is equal to the square root of the sum of the distance between the search target and a user's mood squared. Using this formula, smaller scores are better, so to turn the score into something that looks similar to the movie finder score, it is divided by the maximum possible score (200), and subtracted from 1. Using this new score, higher scores are better, and the client can display it as a percentage match.

In one embodiment, the date a rating or mood is created may be utilized in the processing. In one embodiment, more recent ratings of a movie are weighted to count more than old ratings for movie searches. For user finder, users who have logged in recently may appear higher in the results than users who have not logged in recently. Both of these features can be provided by weighting by date.

To determine the weighting for an item given a date, in one embodiment the following formula is used:

$$1/(2^{\wedge}(AGE\_IN\_DAYS/HALFLIFE))$$

where

AGE_IN_DAYS is, of course, the age of the item in days, and

HALFLIFE is a configurable parameter; representing the number of days that should pass before the item is worth half as much as it is currently.

If the system is set up to take rating date into account, the system would store a weighted average of the ratings based on when they were entered, rather than the true average. In one embodiment, the standard deviation would also be weighted.

In order to take the log-in date of a user into account for the user finder, in one embodiment the user's score is multiplied by the weight based on their last login date. For example, the weighting for "logged in within the last 24 hours" may be 1, while the weighting for "logged in within the last" week would be 0.9, and the weighting for "has not logged in for over one month" may be 0.2. These numbers are merely exemplary, of course.

In this way, the community multi-criteria rating and searching system provides an improved interface for users, and significantly more choices in evaluating movies, media, or other content. Note that while the term "movie" is used for simplicity, this type of evaluation may be applied to other types of data. For example, music, lectures, foods, furniture, etc. may be similarly rated along multiple criteria. However, in one embodiment, by preference the system is used to search and rate media such as movies, television shows, music, etc.

Figure 9:
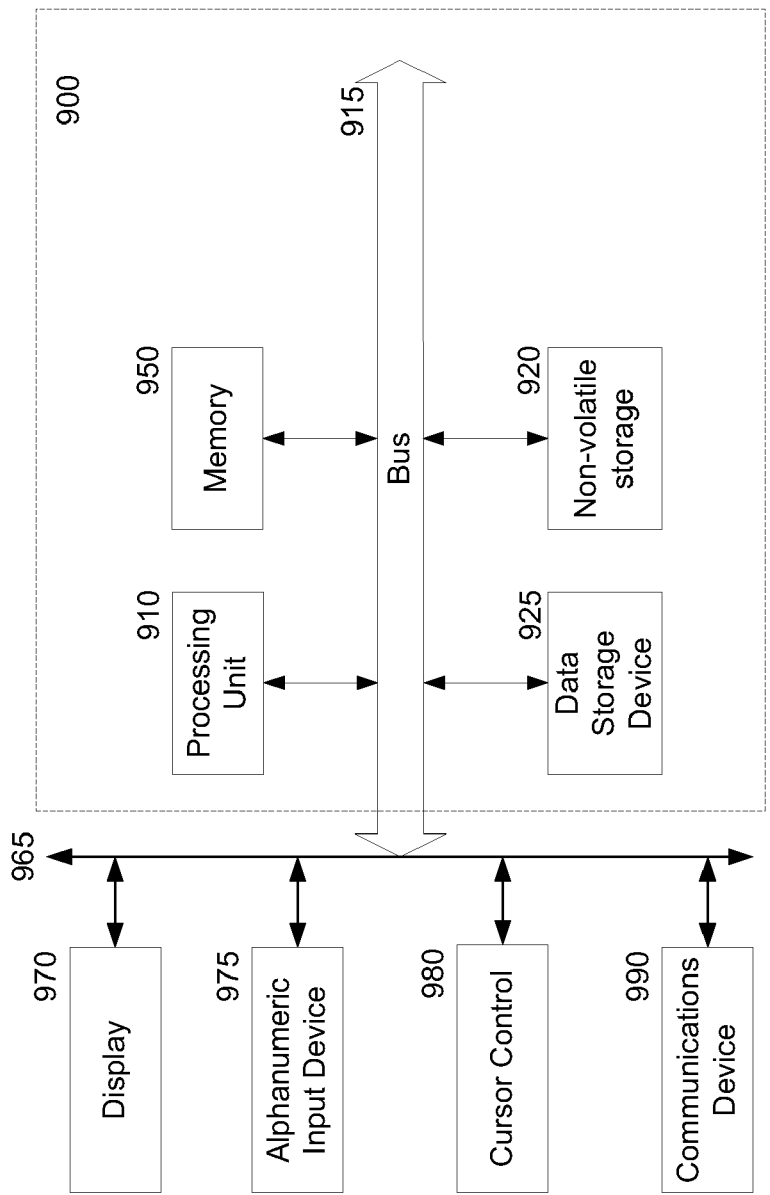
FIG. 9 is a block diagram of one embodiment of a computer system which may be used with the present invention.

FIG. 9 is one embodiment of a computer system that may be used with the present invention. It will be apparent to those of ordinary skill in the art, however that other alternative systems of various system architectures may also be used.

The data processing system illustrated in FIG. 9 includes a bus or other internal communication means 915 for communicating information, and a processor 910 coupled to the bus 915 for processing information. The system further comprises a random access memory (RAM) or other volatile storage device 950 (referred to as memory), coupled to bus 915 for storing information and instructions to be executed by processor 910. Main memory 950 also may be used for storing temporary variables or other intermediate information during execution of instructions by processor 910. The system also comprises a read only memory (ROM) and/or static storage device 920 coupled to bus 915 for storing static information and instructions for processor 910, and a data storage device 925 such as a magnetic disk or optical disk and its corresponding disk drive. Data storage device 925 is coupled to bus 915 for storing information and instructions.

The system may further be coupled to a display device 970, such as a cathode ray tube (CRT) or a liquid crystal display (LCD) coupled to bus 915 through bus 965 for displaying information to a computer user. An alphanumeric input device 975, including alphanumeric and other keys, may also be coupled to bus 915 through bus 965 for communicating information and command selections to processor 910. An additional user input device is cursor control device 980, such as a mouse, a trackball, stylus, or cursor direction keys coupled to bus 915 through bus 965 for communicating direction information and command selections to processor 910, and for controlling cursor movement on display device 970.

Another device, which may optionally be coupled to computer system 900, is a communication device 990 for accessing other nodes of a distributed system via a network. The communication device 990 may include any of a number of commercially available networking peripheral devices such as those used for coupling to an Ethernet, token ring, Internet, or wide area network. The communication device 990 may further be a null-modem connection, or any other mechanism that provides connectivity between the computer system 900 and the outside world. Note that any or all of the components of this system illustrated in FIG. 9 and associated hardware may be used in various embodiments of the present invention.

It will be appreciated by those of ordinary skill in the art that any configuration of the system may be used for various purposes according to the particular implementation. The control logic or software implementing the present invention can be stored in main memory 950, mass storage device 925, or other storage medium locally or remotely accessible to processor 910.

It will be apparent to those of ordinary skill in the art that the system, method, and process described herein can be implemented as software stored in main memory 950 or read only memory 920 and executed by processor 910. This control logic or software may also be resident on an article of manufacture comprising a computer readable medium having computer readable program code embodied therein and being readable by the mass storage device 925 and for causing the processor 910 to operate in accordance with the methods and teachings herein.

The present invention may also be embodied in a handheld or portable device containing a subset of the computer hardware components described above. For example, the handheld device may be configured to contain only the bus 915, the processor 910, and memory 950 and/or 925. The handheld device may also be configured to include a set of buttons or input signaling components with which a user may select from a set of available options. The handheld device may also be configured to include an output apparatus such as a liquid crystal display (LCD) or display element matrix for displaying information to a user of the handheld device. Conventional methods may be used to implement such a handheld device. The implementation of the present invention for such a device would be apparent to one of ordinary skill in the art given the disclosure of the present invention as provided herein.

The present invention may also be embodied in a special purpose appliance including a subset of the computer hardware components described above. For example, the appliance may include a processor 910, a data storage device 925, a bus 915, and memory 950, and only rudimentary communications mechanisms, such as a small touch-screen that permits the user to communicate in a basic manner with the device. In general, the more special-purpose the device is, the fewer of the elements need be present for the device to function. In some devices, communications with the user may be through a touch-based screen, or similar mechanism.

It will be appreciated by those of ordinary skill in the art that any configuration of the system may be used for various purposes according to the particular implementation. The control logic or software implementing the present invention can be stored on any machine-readable medium locally or remotely accessible to processor 910. A machine-readable medium includes any mechanism for storing or transmitting information in a form readable by a machine (e.g. a computer). For example, a machine readable medium includes read-only memory (ROM), random access memory (RAM), magnetic disk storage media, optical storage media, flash memory devices, electrical, optical, acoustical or other forms of propagated signals (e.g. carrier waves, infrared signals, digital signals, etc.).

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A method, implemented by a server computing system programmed to perform the following method, comprising:
providing, by the server computing system, a selection interface for a user to rate media content, the selection interface including a plurality of value pairs, each value pair including two opposite adjectives that could describe the media content;
prompting a user to select a position between the opposite adjectives, the relative closeness between the position and the adjective indicating a rating of the media content;
calculating an average rating for the media content, based on the relative closeness to each adjective in each value pair; and
enabling a user to search for media content based on a plurality of adjectives from the value pairs.

2. The method of claim 1, wherein the relative closeness comprises a percentage rating for both adjectives in the value pair, a total percentage adding up to 100%.

3. The method of claim 1, wherein the value pairs comprise:
Serious—Funny
Mellow—Charged
Deep—Shallow
Tears—Bullets.

4. The method of claim 1, further comprising:
utilizing the value pairs to provide a selection logic for a user mood; and
enabling search for users having a particular mood.

5. A method, implemented by a server computing system programmed to perform the following method, comprising:
providing, by the server computing system, a plurality of selection tools to a user, the selection tools enabling a user to select a relative closeness between two opposite adjectives in a value pair, for a plurality of value pairs for evaluating media content to select a target rating;

utilizing an average rating, based on a plurality of user ratings, of a media content to determine a closeness of match between the selection of the user and the average rating of a media content; and displaying a best match to a user.

6. The method of claim 5, further comprising:

determining a bin that is a closest match to the target rating, the bin comprising a range of values along each dimension.

7. The method of claim 5, further comprising:

determining a geometric distance between a movie's average rating and the target rating as the score function.

8. The method of claim 7, wherein a number of ratings acts as an additional dimension to determine the geometric distance.

9. The method of claim 5 further comprising:

providing a rating interface for a user to select relative closeness between a value pair for rating media content;

adding the user's rating to the average rating for the media content.

10. The method of claim 5, wherein the value pairs comprise:

Serious—Funny

Mellow—Charged

Deep—Shallow

Tears—Bullets.

11. The method of claim 5, further comprising:

utilizing the value pairs to provide a selection logic for a user mood; and enabling search for users having a particular mood.

12. The method of claim 1, further comprising:

utilizing the average rating, based on a plurality of user ratings, of the media content to determine a closeness of match between a target rating of the user and the average rating of a media content.

13. The method of claim 12, further comprising:

determining a bin that is a closest match to the target rating, the bin comprising a range of values along each dimension.

14. The method of claim 12, further comprising: determining a geometric distance between a movie's average rating and the target rating as the score function.

15. The method of claim 14, wherein a number of ratings acts as an additional dimension to determine the geometric distance.

16. A system comprising:

a memory;

a processor coupled to the memory;

a user rating interface executed from the memory by the processor to provide a selection interface to enable a user to rate media content along a range between a pair of opposite adjectives forming a value pair, the user rating interface including a plurality of value pairs;

a rate calculation logic executed from the memory by the processor to calculate an average rating for the media content, based on the rating along the range between value pair; and a search tool executed from the memory by the processor to enable a user to search for media content based on a plurality of value pairs.

17. The system of claim 16, wherein the user is provided a plurality of value pairs.

18. The system of claim 16, further comprising:

the user rating interface executed from the memory by the processor to utilize the value pairs to provide a selection logic for a user mood; and the search tool executed from the memory by the processor to enable search for users having a particular mood.

19. The method of claim 16, further comprising:

the search tool further to utilize the average rating of the media content to determine a closeness of match between a target rating of the user and the average rating of a media content.

20. The method of claim 19, wherein the search tool further determines a geometric distance between a movie's average rating and the target rating as the score function.

\* \* \* \* \*